(12) United States Patent
Murphy

(10) Patent No.: US 8,448,318 B2
(45) Date of Patent: May 28, 2013

(54) REMOVAL TOOL

(75) Inventor: Stephen P. Murphy, Perrysburg, OH (US)

(73) Assignee: First Solar, Inc., Perrysburg, OH (US)

(*) Notice: Subject to any disclaimer, the term of this patent is extended or adjusted under 35 U.S.C. 154(b) by 161 days.

(21) Appl. No.: 12/856,246

(22) Filed: Aug. 13, 2010

(65) Prior Publication Data

US 2011/0035922 A1 Feb. 17, 2011

Related U.S. Application Data

(60) Provisional application No. 61/234,161, filed on Aug. 14, 2009.

(51) Int. Cl.
*B23P 11/00* (2006.01)

(52) U.S. Cl.
CPC ........................................ *B23P 11/00* (2013.01)
USPC ............................................... 29/268; 29/270

(58) Field of Classification Search
CPC ....................................................... B23P 11/00
USPC ............... 29/270, 244, 268, 278, 255; 269/6, 269/3; 81/388, 398–405, 415
See application file for complete search history.

(56) References Cited

U.S. PATENT DOCUMENTS

| | | | |
|---|---|---|---|
| 5,125,324 A * | 6/1992 | Araki et al. ...................... | 91/454 |
| 5,966,790 A * | 10/1999 | Meedt .............................. | 29/239 |
| 6,948,708 B2 * | 9/2005 | Moilanen et al. ............... | 269/32 |
| 7,293,765 B2 * | 11/2007 | Hooper .......................... | 269/246 |
| 7,669,306 B2 * | 3/2010 | Palka .............................. | 29/261 |
| 2003/0085502 A1 * | 5/2003 | Migliori ......................... | 269/228 |
| 2004/0130083 A1 * | 7/2004 | Moilanen et al. ............... | 269/32 |
| 2011/0035922 A1 * | 2/2011 | Murphy ....................... | 29/426.5 |

* cited by examiner

*Primary Examiner* — Lee D Wilson
(74) *Attorney, Agent, or Firm* — Dickstein Shapiro LLP

(57) ABSTRACT

A tool and a method for removing a cord plate or junction box from a surface of a photovoltaic laminated module, that is to be refitted, scrapped or recycled includes a first and a second arm of a clamp mechanism, that can operate like a claw, positioned on opposing sides of the cord plate, at the interface between the cord plate and the module surface. The arms can be pinched together to bring the moving arm closer towards the fixed arm, to apply an upward pressure that breaks the bond between the cord plate and the module surface.

13 Claims, 4 Drawing Sheets

REMOVAL TOOL

CLAIM FOR PRIORITY

This application claims priority under 35 U.S.C. §119(e) to Provisional U.S. Patent Application Ser. No. 61/234,161 filed on Aug. 14, 2009, which is hereby incorporated by reference.

TECHNICAL FIELD

The invention relates to a tool and a method for removing a cord plate or junction box from a photovoltaic module surface.

BACKGROUND

Solar industry manufacturers have established collection and recycling programs to encourage the recovery and reuse of photovoltaic module materials by enabling substantially all of the components of the modules, including glass and semiconductor material, to be treated and processed into new modules or other products. A current known method of removing a cord plate or junction box from a surface of a photovoltaic module is to strike the interface of the cord plate and module surface with a claw hammer. However, the solar industry has faced the challenge of developing a safer, quicker, and easier method to remove the cord plate or junction box from the module surface, whether the module is to be recycled or scrapped.

DETAILED DESCRIPTION

Figure 1:
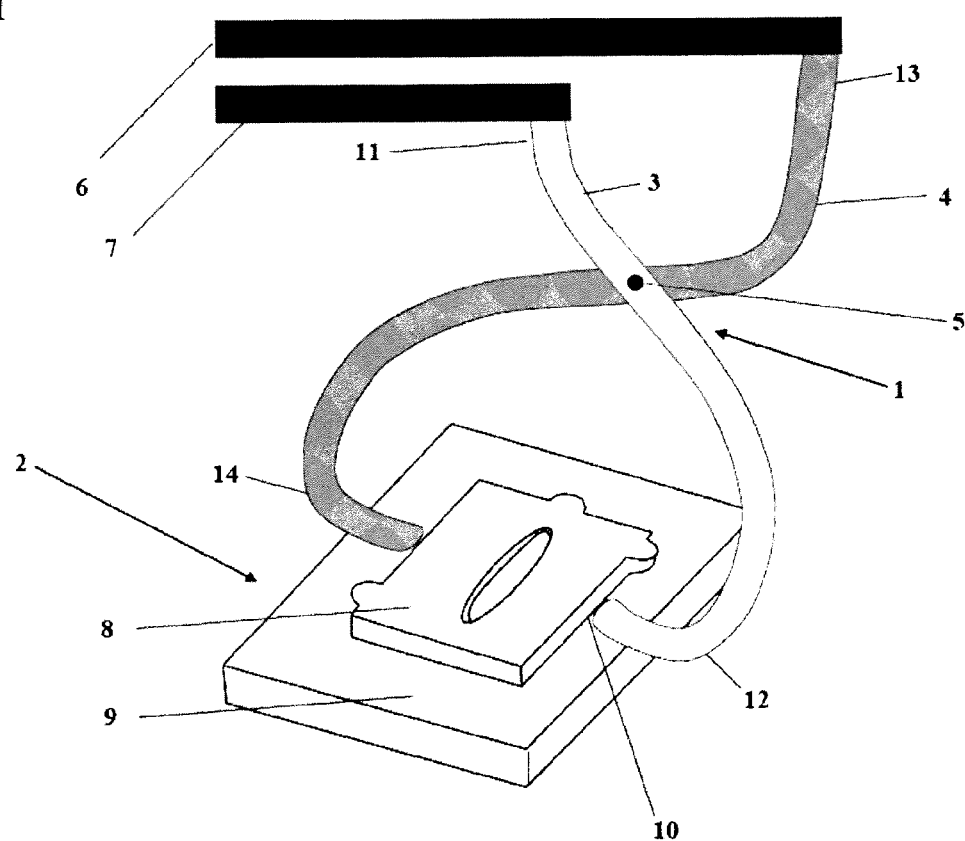
FIG. 1 is a perspective view illustrating a cord plate attached to a module surface, and a cord plate or junction box removal tool in an open position.

A cord plate or junction box can be removed from a photovoltaic module surface, such as, for example, a glass surface of a module, that is to be refitted, scrapped or recycled. A tool is developed for removing a cord plate or junction box from a module surface. The cord plate can be attached to the module surface with a sealant that forms a robust adhesive bond. The cord plate can be made of any suitable material, including any suitable plastic or polycarbonate, such as LEXAN500. The cord plate can be attached to the surface of the module, for example, a glass surface, with a sealant that forms a robust adhesive bond. The sealant can be any suitable low-viscosity sealant, including silicone, acrylic, polysulfide, a butyl sealant, or a one part or two part polyurethane sealant.

In one aspect, a tool that removes a cord plate or junction box from a module surface may include a first arm including a first actuation end and a first clamp end and a second arm including a second actuation end and a second clamp end, pivotally connected to the first arm between the ends of the arms, wherein the first clamp end and second clamp end can be configured to move towards each other and become positioned between the cord plate and the module surface, when the first and second clamp ends of the arms are positioned on opposing sides of the cord plate at the interface between the cord plate and the module surface, and the distance between the actuation ends is decreased. An arm can be fixed. An arm can be moveable. The first arm and the second arm may include a plastic material. The first arm and the second arm may include a metal material. One of the first clamp end and the second clamp end may include a wedge shape. One of the first clamp end and the second clamp end may include a chisel shape. One of the first actuation end and the second actuation end can be connected to an actuator configured to exert a force that decreases the distance between the first actuation end and the second actuation end. The actuator may include a pressure producing device, wherein the pressure producing device releases air configured to exert the force that decreases the distance between the first actuation end and the second actuation end. The pressure producing device may include an air cylinder. The pressure producing device may include an electric air pump. The tool actuator may include a screw drive. The actuator may include an electric device, wherein the electric device exerts a force that decreases the distance between the first actuation end and the second actuation end. The electric device may include an electric motor.

In one aspect, a method of removing a cord plate or junction box from a module surface may include positioning a first arm including a first actuation end and a first clamp end, and a second arm including a second actuation end and a second clamp end, pivotally connected between the ends of the arms, on opposing sides of the cord plate, at the interface between the cord plate and the module surface, moving the arms of the clamp towards each other to become positioned between the cord plate and the module surface, and applying an upward pressure that breaks the bond between the cord plate and the module surface. One of the first actuation end and the second actuation end can be connected to an actuator configured to exert a force that decreases the distance between the first actuation end and the second actuation end. The actuator may include a pressure producing device, wherein the pressure producing device releases air configured to exert the force that decreases the distance between the first actuation end and the second actuation end. The pressure producing device may include an air cylinder. The pressure producing device may include an electric air pump. The actuator may include a screw drive. The actuator may include an electric device, wherein the electric device exerts a force that that decreases the distance between the first actuation end and the second actuation end. The electric device may include an electric motor.

Referring to FIG. 1, cord plate removal tool 1 is positioned on the cord plate, module surface assembly 2. Cord plate removal tool 1 is a clamp mechanism, which operates like a claw. Cord plate removal tool 1 can include a first arm 3 and a second arm 4, which can both have the same claw shape. First arm 3 can include actuation end 11 and clamp end 12. Second arm 4 can include actuation end 13 and clamp end 14. Second arm 4 is connected to first arm 3 at pivot point 5 located between the ends of the arms. First arm 3 may be moveable, and second arm 4 may be fixed. Clamp end 12 and clamp end 14 may include a wedge or a chisel shape.

Actuation end 13 of second arm 4 can be connected to fixed member 6, which holds second arm 4 in a fixed position. Actuation end 11 of first arm 3 can be connected to moving member 7. Movement of moving member 7 causes movement of first arm 3. First arm 3, second arm 4, fixed member 6, and moving member 7 can be made of any suitable material, including plastic or metal.

Clamp end 12 of first arm 3 and clamp end 14 of second arm 4 are positioned on opposing sides of cord plate 8, at interface 10 between cord plate 8 and module surface 9. As is shown in FIG. 1, cord plate removal tool 1 is in an open position.

Figure 2:
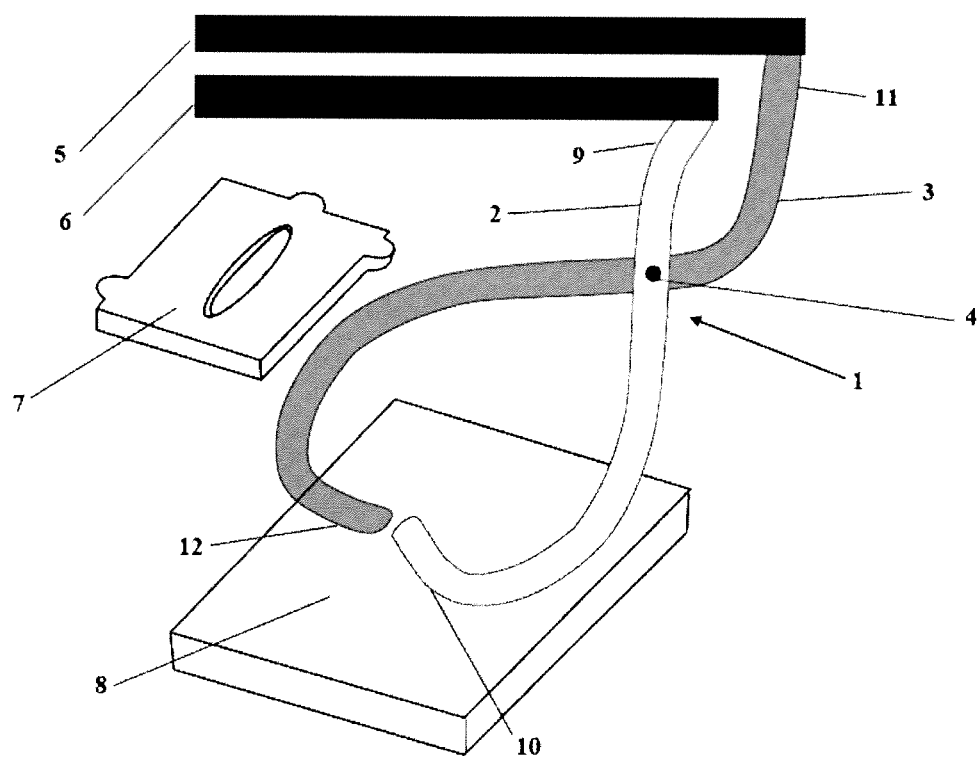
FIG. 2 is a perspective view illustrating a cord plate when removed from a module surface, and a cord plate or junction box removal tool in a closed position.

Referring to FIG. 2, cord plate removal tool 1 is in a closed position on module surface 8. Cord plate removal tool 1 is a clamp mechanism, which operates like a claw. Cord plate removal tool 1 can include a first arm 2 and a second arm 3, which can both have the same claw shape. First arm 2 can include actuation end 9 and clamp end 10. Second arm 3 can include actuation end 11 and clamp end 12. Second arm 3 is connected to first arm 2 at pivot point 4 located between the ends of the arms. First arm 2 may be moveable, and second arm 3 may be fixed. Clamp end 10 and clamp end 12 may include a wedge or a chisel shape.

Actuation end 11 of second arm 3 can be connected to fixed member 5, which holds second arm 3 in a fixed position. Actuation end 9 of first arm 2 can be connected to moving member 6. Movement of moving member 6 causes movement of first arm 2. First arm 2, second arm 3, fixed member 5, and moving member 6 can be made of any suitable material, including plastic or metal.

Applying a force to moving member 6, can pinch together first arm 2 and second arm 3, which decreases the distance between actuation end 9 and actuation end 11, to apply an upward pressure that breaks the bond between cord plate 7 and module surface 8.

Figure 3:
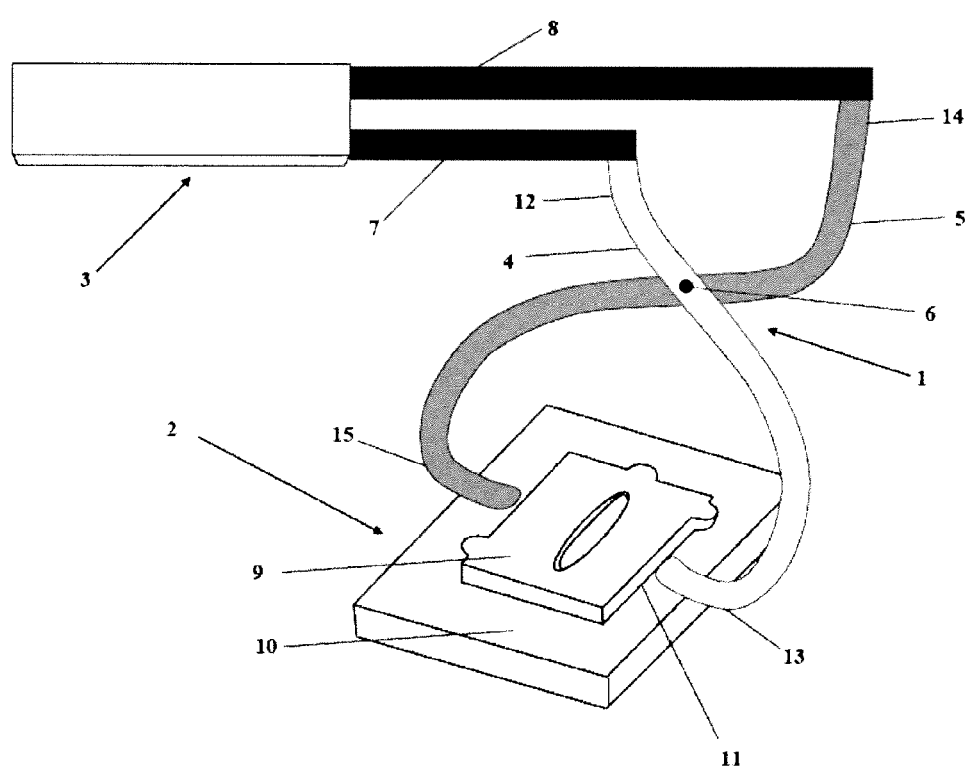
FIG. 3 is a perspective view illustrating a cord plate attached to a module surface, and a cord plate or junction box removal tool in an open position, connected to a pressure producing device.

Referring to FIG. 3, cord plate removal tool 1 is positioned on the cord plate, module surface assembly 2. Cord plate removal tool 1 is a clamp mechanism, which operates like a claw. Cord plate removal tool 1 can include a first arm 4 and a second arm 5, which can both have the same claw shape. First arm 4 can include actuation end 12 and clamp end 13. Second arm 5 can include actuation end 14 and clamp end 15. Second arm 5 is connected to first arm 4 at pivot point 6 located between the ends of the arms. First arm 4 may be moveable, and second arm 5 may be fixed. Clamp end 13 and clamp end 15 may include a wedge or a chisel shape.

Actuation end 14 of second arm 5 can be connected to fixed member 8, which holds second arm 5 in a fixed position. Actuation end 12 of first arm 4 can be connected to moving member 7. Movement of moving member 7 causes movement of first arm 4. First arm 4, second arm 5, fixed member 8, and moving member 7 can be made of any suitable material, including plastic or metal.

Clamp end 13 of first arm 4 and clamp end 15 of second arm 5 are positioned on opposing sides of cord plate 9 at interface 11 between cord plate 9 and module surface 10.

Pressure producing device 3 can be connected to fixed member 8 and moving member 7. Pressure producing device 3 can include an air cylinder or an electric air pump, which can release air that exerts a force on moving member 7. This force causes the pinching together of first arm 4 and second arm 5 to decrease the distance between actuation end 12 and actuation end 14, which applies an upward pressure that breaks the bond between cord plate 9 and module surface 10.

Another embodiment of cord plate removal tool 1 can include an electric device connected to fixed member 8 and moving member 7. The electric device can include an electric motor, which can exert a force on moving member 7. This force causes the pinching together of first arm 4 and second arm 5 to decrease the distance between actuation end 12 and actuation end 14, which applies an upward pressure that breaks the bond between cord plate 9 and module surface 10.

Figure 4:
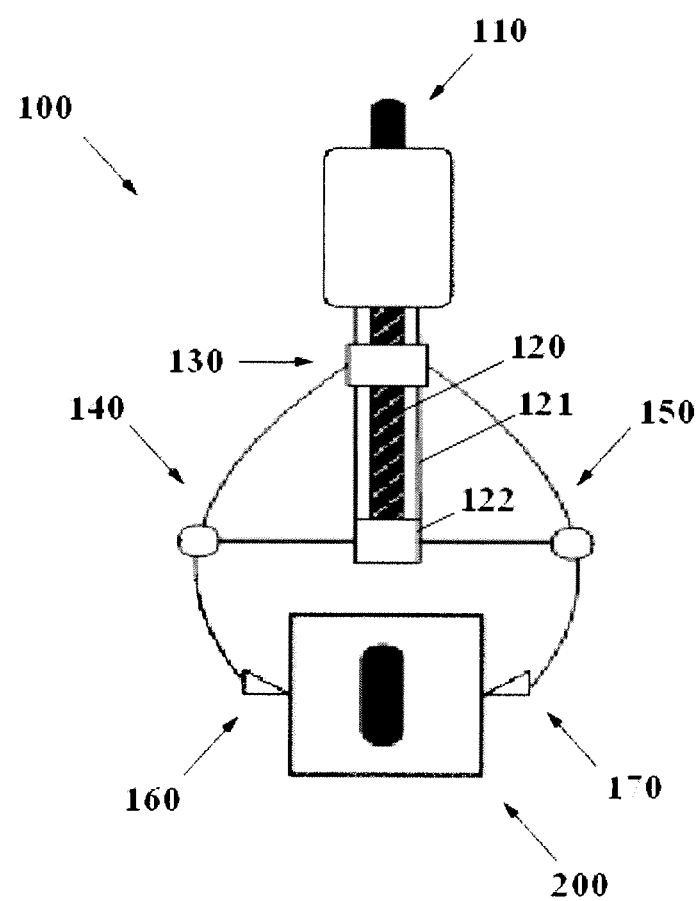
FIG. 4 is a diagram illustrating a cord plate attached to a module surface, and a cord plate or junction box removal tool in an open position with a screw actuation mechanism.

Referring to FIG. 4, cord plate removal tool 100 is positioned adjacent to cord plate 200. Cord plate removal tool 100 can include a screw actuation mechanism. Motion-transmitting member 110 can be connected to drive screw 120. Cord plate removal tool 100 can have a clamp mechanism, which operates like a claw. Cord plate removal tool 100 can include first arm 140 and second arm 150, which can both have the same claw shape. When screw 120 rotates, center block 130 can move up/down to exert a force on arm 140 and 150. Clamp end 160 of first arm 140 and clamp end 170 of second arm 150 are positioned on opposing sides of cord plate 200. Clamp end 160 and clamp end 170 may include a wedge or a chisel shape. First arm 140 and second arm 150 can be connected in the way that when center block 130 moves down, clamp end 160 and clamp end 170 can move towards each other to generate an upward pressure that breaks the bond between the cord plate and the module surface. In some embodiments, screw 120 can be held within nut 121 by thread stop structure 122. In that way, once removal tool 100 is assembled, it generally cannot be easily disassembled. This reduces any inadvertent disassembly of the screw actuation mechanism during operation. Screw 120 can be driven by an electric motor, drill, or any other suitable power device.

A number of embodiments of the invention have been described. Nevertheless, it will be understood that various modifications may be made without departing from the spirit and the scope of the invention. It should also be understood that the appended drawings are not necessarily to scale, presenting a somewhat simplified representation of various preferred features illustrative of basic principles of the invention.

What is claimed is:

1. A system that removes a cord plate or junction box from a module surface, the system comprising:

the cord plate or junction box wherein at least one of the cord plate or junction box is part of said system;

a tool comprising a first arm comprising a first actuation end and a first clamp end; and a second arm comprising a second actuation end and a second clamp end, pivotally connected to the first arm between the ends of the arms, wherein the first clamp end and second clamp end are configured to move towards each other and become positioned between the cord plate or the junction box and the module surface, when the first and second clamp ends of the arms are positioned on opposing sides of the cord plate or the junction box at the interface between the cord plate and the module surface, and the distance between the actuation ends is decreased.

2. The tool of claim 1, wherein an arm is fixed.

3. The tool of claim 1, wherein an arm is moveable.

4. The tool of claim 1, wherein the first arm and the second arm comprise a plastic material.

5. The tool of claim 1, wherein the first arm and the second arm comprise a metal material.

6. The tool of claim 1, wherein one of the first clamp end and the second clamp end comprises a wedge shape.

7. The tool of claim 1, wherein one of the first clamp end and the second clamp end comprises a chisel shape.

8. The tool of claim 1, wherein one of the first actuation end and the second actuation end is connected to an actuator configured to exert a force that decreases the distance between the first actuation end and the second actuation end.

9. The tool of claim 8, wherein the actuator comprises a pressure producing device, wherein the pressure producing device releases air configured to exert the force that decreases the distance between the first actuation end and the second actuation end.

10. The tool of claim 9, wherein the pressure producing device comprises an air cylinder or an electric air pump.

11. The tool of claim 8, wherein the actuator comprises a screw drive.

12. The tool of claim 8, wherein the actuator comprises an electric device, wherein the electric device exerts a force that decreases the distance between the first actuation end and the second actuation end.

13. The tool of claim 12, wherein the electric device comprises an electric motor.

* * * * *